(12) United States Patent
Zambuto et al.

(10) Patent No.: US 7,929,140 B2
(45) Date of Patent: Apr. 19, 2011

(54) SPECTROSCOPY PROBE AND MATERIAL PROCESSING SYSTEM

(75) Inventors: James Zambuto, Winchester, MA (US); Walid A. Atia, Lexington, MA (US); Christopher C. Cook, Bedford, MA (US)

(73) Assignee: Axsun Technologies, Inc., Billerica, MA (US)

( * ) Notice: Subject to any disclaimer, the term of this patent is extended or adjusted under 35 U.S.C. 154(b) by 321 days.

(21) Appl. No.: 11/419,193

(22) Filed: May 18, 2006

(65) Prior Publication Data

US 2007/0024847 A1    Feb. 1, 2007

Related U.S. Application Data

(60) Provisional application No. 60/682,606, filed on May 18, 2005, provisional application No. 60/737,506, filed on Nov. 17, 2005.

(51) Int. Cl.
*G01J 3/44* (2006.01)
*B01F 15/00* (2006.01)
*G01N 21/01* (2006.01)

(52) U.S. Cl. .................. 356/440; 366/142; 356/300

(58) Field of Classification Search .............. 366/142
See application file for complete search history.

(56) References Cited

U.S. PATENT DOCUMENTS

| | | | |
|---|---|---|---|
| 4,919,535 A | 4/1990 | Hohberg et al. | |
| 5,164,586 A | 11/1992 | Hohberg et al. | |
| 5,452,723 A * | 9/1995 | Wu et al. .................. | 600/342 |
| 5,657,119 A * | 8/1997 | Kawasaki et al. .......... | 356/300 |
| 5,826,214 A * | 10/1998 | Lieb et al. ................. | 702/24 |
| 6,517,230 B1 | 2/2003 | Afnan et al. | |
| 6,537,270 B1 * | 3/2003 | Elbrecht et al. ........... | 606/17 |
| 7,061,618 B2 | 6/2006 | Atia et al. | |
| 7,127,356 B2 * | 10/2006 | Nicoli et al. ............... | 702/26 |
| 2002/0001078 A1 | 1/2002 | Gobel et al. | |
| 2003/0078753 A1 * | 4/2003 | Campin et al. ............. | 702/124 |
| 2003/0202180 A1 | 10/2003 | Gobel et al. | |
| 2004/0008570 A1 | 1/2004 | Folestad et al. | |
| 2004/0019462 A1 * | 1/2004 | Gehrlein et al. .......... | 702/188 |
| 2004/0056197 A1 * | 3/2004 | Davidson et al. ......... | 250/339.1 |
| 2004/0057650 A1 | 3/2004 | Folestad | |
| 2004/0075844 A1 * | 4/2004 | Marron et al. ............ | 356/514 |
| 2004/0165475 A1 | 8/2004 | Afnan et al. | |
| 2006/0001855 A1 * | 1/2006 | Lof et al. .................. | 355/69 |
| 2008/0123908 A1 * | 5/2008 | Waldman et al. .......... | 382/124 |

OTHER PUBLICATIONS

U.S. Appl. No. 11/158,617, filed Jun. 22, 2005, Flanders et al.
Workman, Jerome et al., "Process Analytical Chemistry," Analytical Chemistry, vol. 71, No. 12, Jun. 15, 1999, pp. 121R-180R.
Workman, Jerome J., Review of Process and Non-invasive Near-Infrared and Infared Spectroscopy: 1993-1999, Applied Spectroscopy Reviews, 34 (18,2), 1999, pp. 1-89.

* cited by examiner

*Primary Examiner* — Gregory J Toatley
*Assistant Examiner* — Rebecca C Slomski
(74) *Attorney, Agent, or Firm* — Houston Eliseeva, LLP

(57) ABSTRACT

A process monitoring system determines a spectral response of a process material. This system has a tunable laser for generating an optical signal that is wavelength tuned over a scan band and an optical probe for conveying the optical signal to the process material and detecting the spectral response of the process material. The optical probe expands a beam of the optical signal to a diameter of greater than 10 millimeters. This avoids one of the difficulties with monitoring these process applications by ensuring that the spectroscopy measurements are accurate and repeatable. It is desirable to sample a relatively large area of the processed material since it can be heterogeneous. Additionally the large area mitigates spectral noise such as from speckle.

16 Claims, 9 Drawing Sheets

Section A-A

SPECTROSCOPY PROBE AND MATERIAL PROCESSING SYSTEM

RELATED APPLICATIONS

This claims the benefit under 35 USC 119(e) of U.S. Provisional Application No. 60/737,506, filed Nov. 17, 2005, and of U.S. Provisional Application No. 60/682,606, filed May 18, 2005, both of which are incorporated herein by this reference in their entirety.

BACKGROUND OF THE INVENTION

Spectroscopy, and specifically near infrared (NIR) spectroscopy, has been proposed as a technique for process monitoring in the manufacture of substances, such as pharmaceutical products. For example, in drying applications, e.g., pill drying, the spectroscopy instruments can be used to monitor the water or solvent content during the drying process. This allows the process to be terminated at the optimal time, saving energy and ensuring product uniformity between batches. In blending applications, spectroscopy can be used to monitor the distribution of the active ingredient in the binder material to insure that the processed material is completely admixed and thereafter terminate the blending process.

SUMMARY OF THE INVENTION

One of the difficulties with monitoring in these process applications is ensuring that the spectroscopy measurements are accurate and repeatable. It is desirable to sample a relatively large area of the processed material since it can be heterogeneous at small scales. Additionally the large area mitigates spectral noise such as from speckle, which is associated with the use of coherent sources such as lasers.

In general, according to one aspect, the invention features a process monitoring system for determining a spectral response of a process material. This system comprises a tunable laser for generating an optical signal that is wavelength tuned over a scan band and an optical probe for conveying the optical signal to the process material and detecting the spectral response of the process material. The optical probe expands a beam of the optical signal to a diameter of greater than 10 millimeters.

In embodiments, the diameter of the beam of the optical signal is collimated and greater than 20 millimeters, and even 30 millimeters in diameter and the beam of the optical signal has a divergence angle of less than 4 degrees. Preferably, a window element between the probe and the process material is made of nitrogen impregnated sapphire.

The tunable laser preferably comprises semiconductor tunable laser.

In one implementation, the optical probe comprises a frame, a projection lens system carried by the frame for receiving the optical signal from a semiconductor tunable laser and expanding and collimating the beam of the optical signal, a detector for detecting light from the process material, and a collection lens system for collecting light from the process material and directing the light to the detector.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
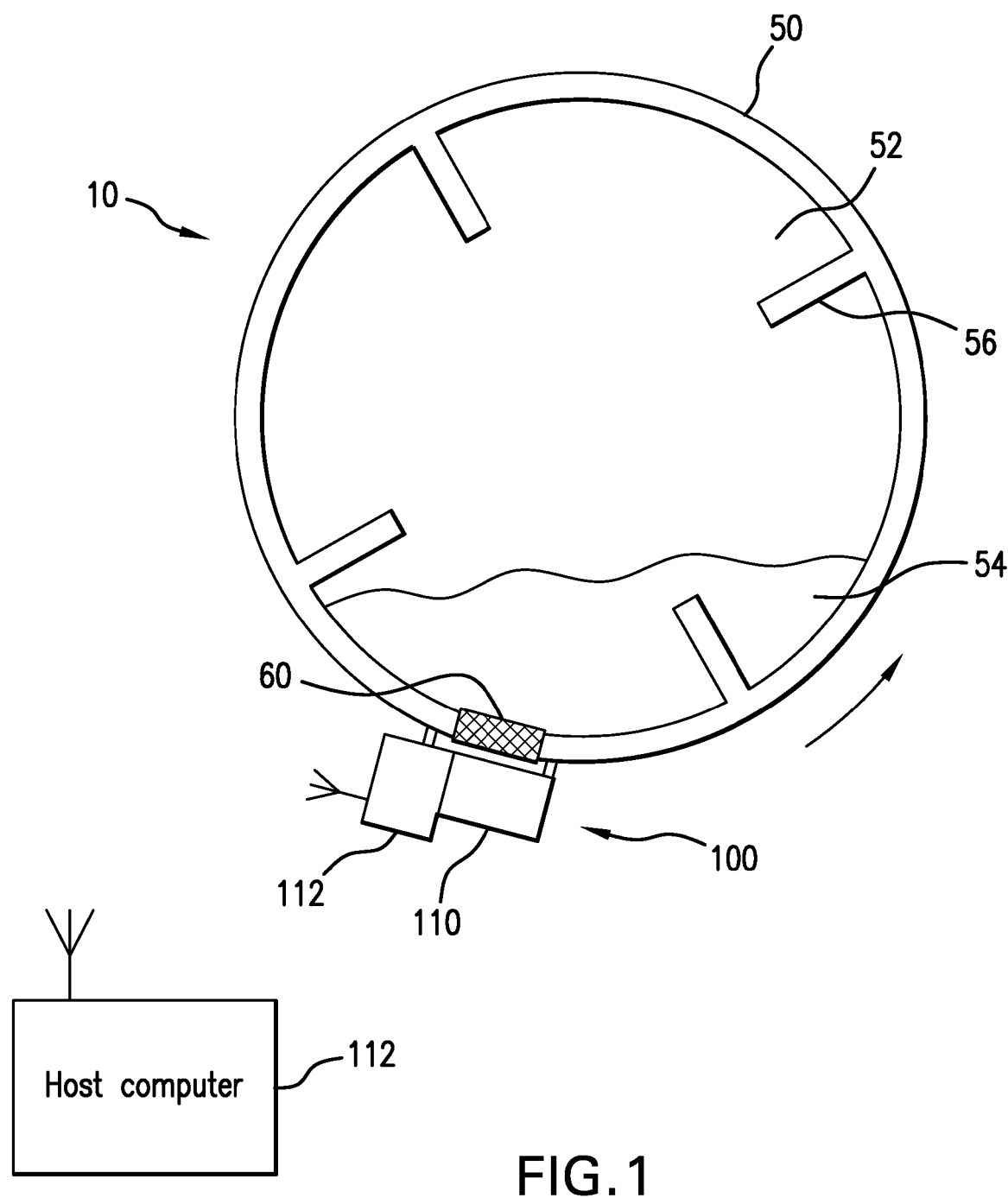
FIG. 1 is a schematic view of a material processing system with the inventive spectroscopic process monitoring system.

FIG. 1 illustrates an exemplary material processing system 10 incorporating a process monitoring system 100, which have been constructed according to the principles of the present invention.

In more detail, the illustrated blender-type processing system 10 comprises a drum 50. This contains the process material 54 that is to be blended. In one example, the material includes a binder material or vehicle and active ingredient(s) that must be dispersed evenly throughout the material 54. This material 54 is contained within the interior 52 of the drum 50. In one example, the drum 50 includes blades 56 for facilitating the mixing of the substance 54. The entire drum in the illustrated implementation rotates to thereby create the mixing action. In other examples, a V-blender design is used. Further, in other examples, the drum does not rotate but instead the blending is performed by a rotating auger or mixing blade in the drum or a vibratory action.

In other examples, the processing system 10 is a dryer, such as a pill dryer. In such example, the processing is intended to remove water or other solvent. In still other examples, the processing system supports a chemical reaction in a batch process or a continuous process system.

The process monitoring system 100 is used to monitor the spectroscopic response of the process material 54 within the blender drum 50. In the illustrated example, a region of the sidewall of the drum 50 contains a window element 60. In one example, this window element 60 is made from sapphire, which has a negligible spectral signature in the near infrared.

In a preferred embodiment, the window element 60 is nitrogen impregnated sapphire. AlON, with nominal chemical composition of 9($Al_2O_3$)5(AlN). This is a material having a spinel crystal structure and chemical resistance properties very similar to sapphire ($Al_2O_3$) but powder processed and mixed with nitrogen (4-5%) to eliminate birefringence (ALON is optically isotropic).

A spectroscopic optical probe 110 is secured to the outside of the drum 50 and opposite the window element 60. The optical probe 110 optically interfaces or couples a source of a tunable signal 200 to the inside of the drum 52 via the window element 60 and includes a detector for detecting the diffusely reflected light from the process material sample 54, enabling the spectrometer system 100 to determine the spectroscopic response of the process material 54.

In the preferred embodiment, the tunable signal source 112 is a laser is constructed as described in U.S. Patent Application Publication No., US 2006/0215713 A1, published on Sep. 28, 2006, entitled, "Laser with Tilted Multi Spatial Mode Resonator Tuning Element," by Dale C. Flanders, et al., which is incorporated herein by this reference in its entirety. In other examples the tunable signal source is constructed as described in U.S. Pat. No. 7,061,618 B2, Issued on Jun. 13, 2006, entitled Integrated Spectroscopy System by Walid A. Atia et al, which is incorporated herein by this reference in its entirety. Generally, the tunable signal source comprises a semiconductor gain medium that is optically coupled to the probe via optical fiber, preferably single mode fiber.

In the illustrated embodiment, the tunable source or tunable laser 112 and probe 110 are secured to the drum to rotate with the drum. In one example, the spectroscopy system 100 is battery powered and uploads spectroscopy data to a host computer 114 that controls the processing system 10.

In the preferred embodiment, the tunable source system 112 generates a tunable laser signal that scans over a spectral scan band. Typically, there is signature information in this scan band that characterizes the process material 54, such as the active ingredient(s) or solvent. By scanning the laser signal over the scan band, and detecting the diffusely reflected response in the scan band with the probe detector, the spectroscopic response of the process material 54 is resolved to determine a process parameter such as the level of mixing or moisture of the material 54.

Figure 2A:
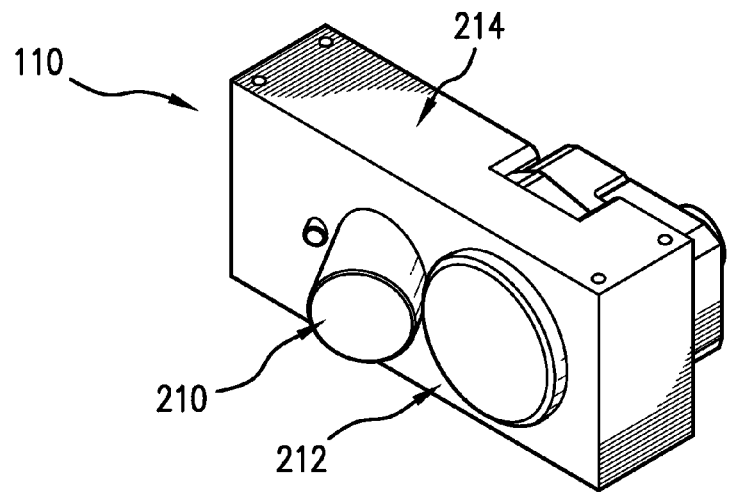
FIGS. 2A, 2B, and 2C are perspective, top plan, and cross sectional views of a first embodiment of an optical probe for the process monitoring system, according to the present invention.

FIG. 2A is a perspective view of a first embodiment of the probe 110. It comprises a projection lens system unit 210 that projects the tunable signal from a laser through the sapphire window 60 to the process material 54. A collection lens system 212 is used to collect the diffusely reflected light from the material 54 and focus it onto a detector. The projection lens system 210 and the collection lens system 212 are located within a housing 214, which is usually bolted or otherwise secured to the drum 50 of the processing system 10.

Figure 2B:
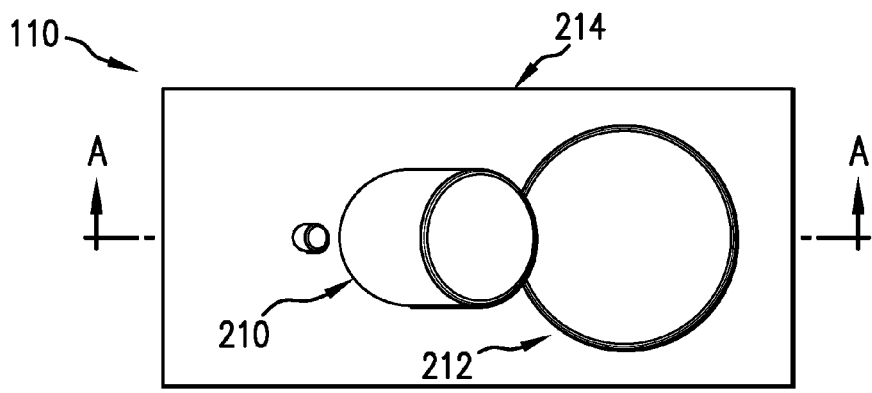

FIG. 2B shows the top of the probe 110 with the projection lens system 210, the collection lens system 212, and housing 214.

Figure 2C:
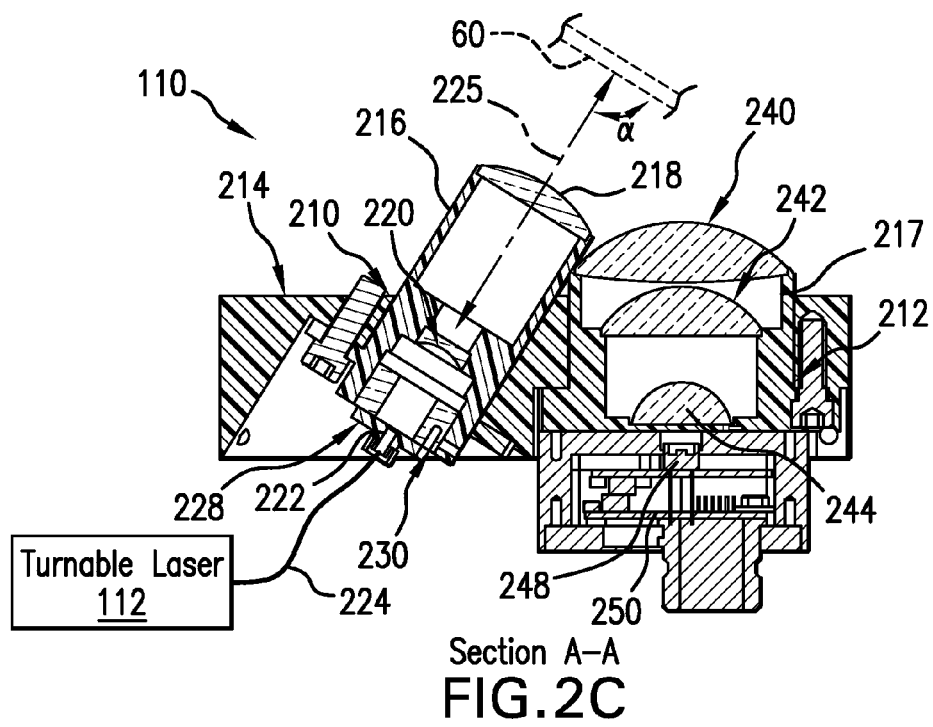

FIG. 2C is a cross-sectional scale view of the probe 110 taken along line A-A in FIG. 2B. The projection unit 210 comprises a cylindrical frame 216. This holds an outer convex lens 218 and an inner concave lens 220. An optical input fiber 224 carries the tunable optical signal from the tunable laser 112. These lenses 218, 220 work together to collimate a beam of the tunable optical signal emitted from a fiber endface/connector assembly 222.

In the illustrated example, the combination of the concave lens 220 and convex lens 218 produce a generally collimated, large diameter beam, which is preferably greater than 10 millimeters in diameter. In the preferred embodiment, it is even larger, greater than 20 millimeters or even 30 to 40 millimeters in diameter or larger (diameter being measured from the $1/e^2$ point). The large spot size enables the sampling over a large region of the substance 54, specifically a region corresponding to the volume of a dosage, such as a pill, and to mitigate speckle. Spectral noise from speckle is generally inversely proportional to illumination spot size.

In the preferred embodiment, this optical input fiber 224 is single lateral mode polarization maintaining optical fiber or other polarization controlling fiber such as fiber that transmits only a single polarization. The optical fiber 224 ends in a fiber collimator assembly 222. This is held in a plate 228, which is secured to a spacer 230 that spaces the collimator assembly from the concave lens 220.

In the preferred embodiment, the optical axis 225 of the projection lens unit is nearly perpendicular or perpendicular to the window 60. This is done because the spectrometer is preferably a tunable laser with a semiconductor source. As such, it produces highly polarized light. The near perpendicular to perpendicular arrangement minimizes polarization dependent loss (PDL) of the window and any resulting spectral structure due to temperature dependent birefringence in the fiber.

Currently the angle α between the optical axis 225 and the window 60 is between 75 and 90 degrees. A slight angling from perpendicular is used to reduce stray light and feedback into the tunable laser 112; the range of 80-85 degrees is preferred, with 82.5 degrees currently being used.

The collection lens system 212 comprises a series of convex collection lenses, held in a cylindrical frame 217, that collect light from the substance 54 traversing through the sapphire window 60 over a large numerical aperture.

The collection lens system 212 comprises a first outer convex lens 240. A second convex lens 242 further collects the signal from the sample and directs it to a third convex lens 244. This focuses the signal from the sample on to a photodetector 248, which is held on a circuit board 250. In the preferred embodiment, this photodetector system further comprises a temperature controller, such as by a thermoelectric cooler, in order to control its temperature to improve performance and stability over changes in ambient temperature.

Figure 3:
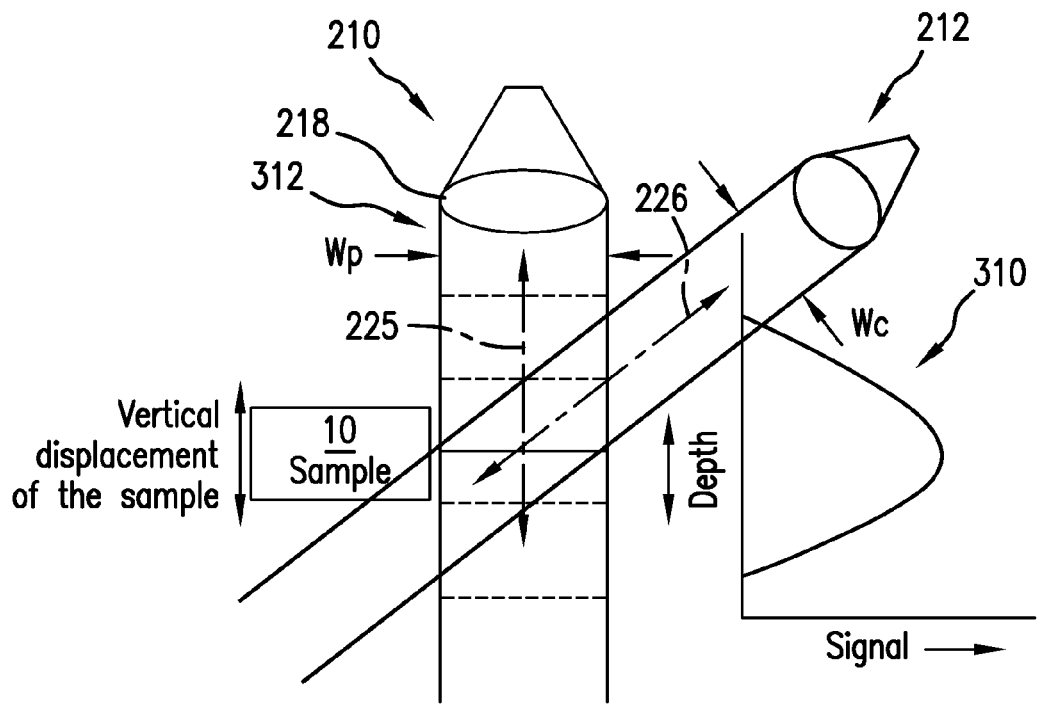
FIG. 3 is a schematic view of the optical probe illustrating the relationship between beam size and sample distance/response dependency.

FIG. 3 is a schematic diagram illustrating the response as a function of sample to projection lens assembly distance. Specifically, because of the angle between the optical axis 225 of the projection lens system 210 and the optical axis 226 of the collection lens assembly 212, the signal response varies as a function of the distance between projection lens system 210 and the sample 10. Specifically, this relationship is generally illustrated in the insert graph 310. This dependency is mitigated by the increased size $W_p$ of the tunable optical signal beam. Specifically, by increasing the $W_p$ of the beam 312, the relationship between the change in signal as a function of sample depth is minimized.

Figure 4:
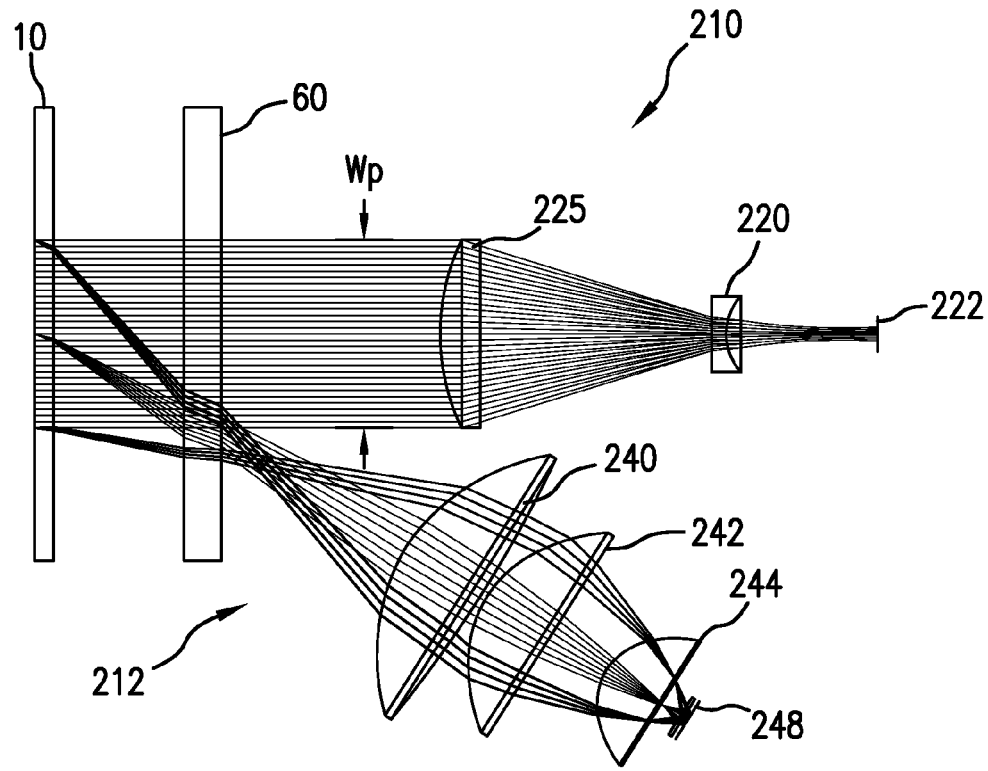
FIG. 4 is a ray trace for the first embodiment optical probe.

FIG. 4 is a ray trace illustrating the relationship between the projection lens system 210 and the rays collected by the collection lens system 212.

As illustrated, the high NA lens system of the collection lens system 212 collects signal over the entire expanse of the tunable optical signal beam projected onto sample 10.

In one embodiment, the detector 248 is moved a few millimeters, between 2 and 10 millimeters from the focal point of the last lens 244 to create a defocused configuration.

Figure 5:
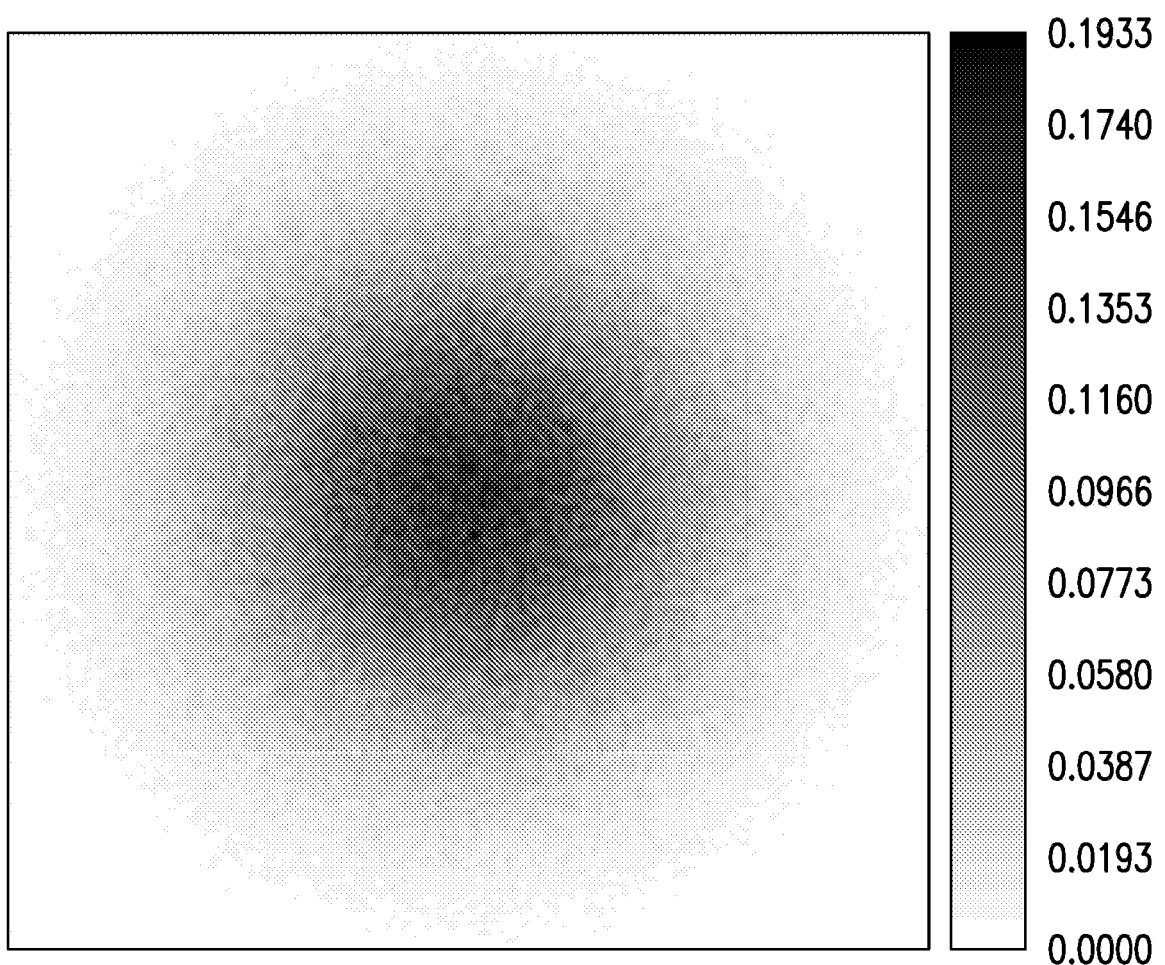
FIG. 5 shows an intensity distribution for the tunable signal from the projection lens assembly of the first embodiment probe.

FIG. 5 illustrates the beam intensity distribution of the tunable signal from the projection lens unit 210. The distribution was derived from a MontiCarlo simulation taken in plane perpendicular to optical axis 225 of the projection lens system 210. It shows how the Gaussian intensity distribution of the single mode fiber 224 is maintained to the sample 10.

Figure 6A:
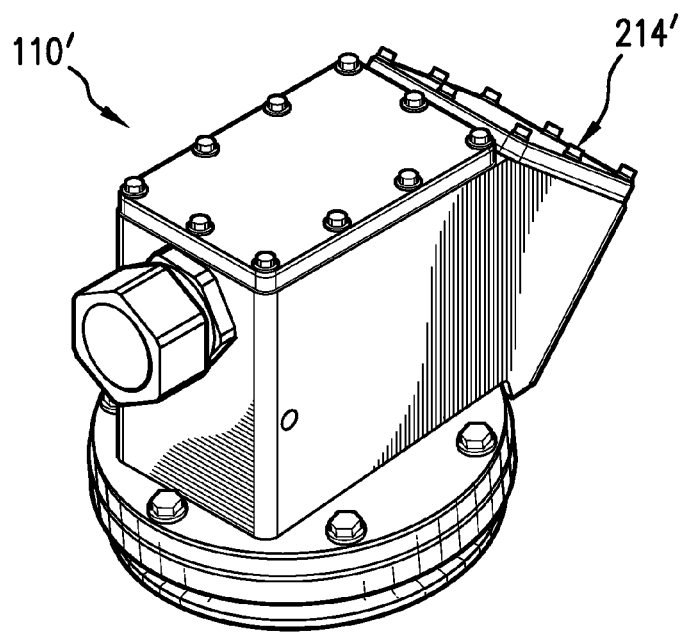
FIGS. 6A and 6B are perspective and cross sectional views of an optical probe according to a second embodiment of the present invention.

FIG. 6A is a perspective view of a second embodiment of the probe 110'. It similarly comprises a projection lens system that projects the tunable signal from a laser and collection lens system. In this view, they are hidden by the housing 214', which provides an air sealed arrangement so that the optical assembly can be filled with an inert gas to control spectral noise from water vapor, for example.

Figure 6B:
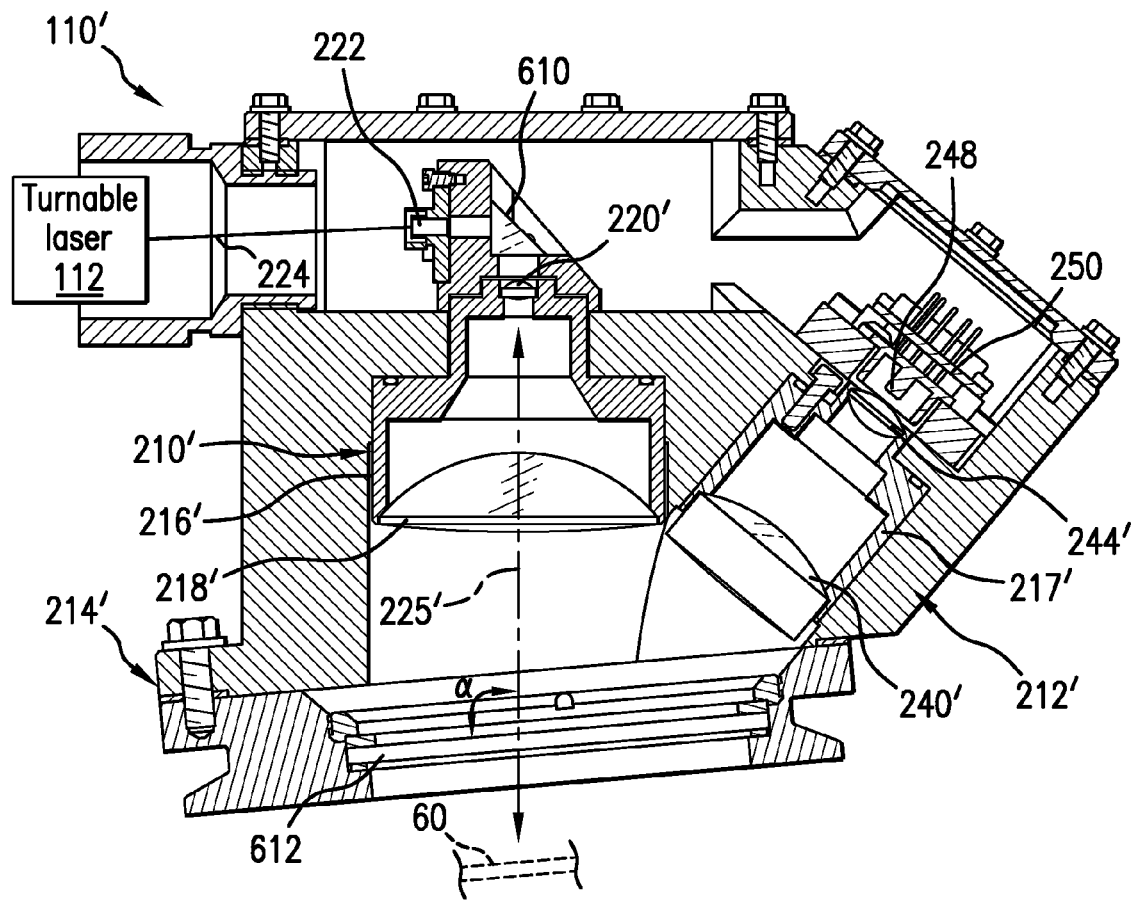

FIG. 6B is a cross-sectional scale view of the probe 110'. The projection unit 210' of the second embodiment comprises a cylindrical frame 216' held in housing 214'. This holds outer convex lens 218' and an inner convex lens 220'. An optical input fiber 224 carries the tunable optical signal from the tunable laser 112 to the output fiber facet in the connector assembly 222. These lenses 218', 220' work together to form a collimated beam of the tunable optical signal emitted from a fiber endface/connector assembly 222.

In the second embodiment 110', a reflecting prism 610 is used as a fold mirror between the endface 222 and lens 220' to facilitate the construction of more height-compact optical train.

In the illustrated example, the combination of the convex lenses 218', 220' produce a generally collimated, large diameter beam, which is preferably greater than 10 millimeters in diameter. In the preferred embodiment, it is even larger, greater than 20 millimeters or even 30 to 40 millimeters in diameter or larger. The large spot size is important to sample over a large region of the substance 54 and to mitigate speckle. Spectral noise from speckle is generally inversely proportional to illumination spot size. The second embodiment differs from the first embodiment in that the Gaussian beam output from the single mode fiber 224 is converted to a beam with a top-hat intensity distribution measured in a plane perpendicular to the optical axis 225' of the projection lens system 210' by using aspheric lenses 218' and 220'.

In this second embodiment, the optical axis 225' is nearly perpendicular or perpendicular to the window 60. This is done to minimize PDL. A probe housing window 612, which is preferable also AlON, is further used in this second embodiment to enable the airtight sealing of the optics in the probe 110'.

Currently the angle α between the optical axis 225' and the window 60 and the probe window 612 is similarly in the range of 80-85 degrees is preferred.

The collection lens system 212' comprises a series of convex collection lenses, held in a cylindrical frame 217', that collects light from the substance 54 traversing through the sapphire window 60 and probe window 612 over a large numerical aperture. The cylindrical frame 217' is in turn held in the probe housing 214'.

The collection lens system 212' comprises a first outer convex lens 240'. A second convex lens 242', which is preferably biconvex, further collects the signal from the sample and focuses the signal from the sample on to photodetector 248, which is held on a circuit board 250. In the preferred embodiment, this photodetector system further comprises a temperature controller, such as by a thermoelectric cooler, in order to control its temperature to improve performance.

Figure 7:
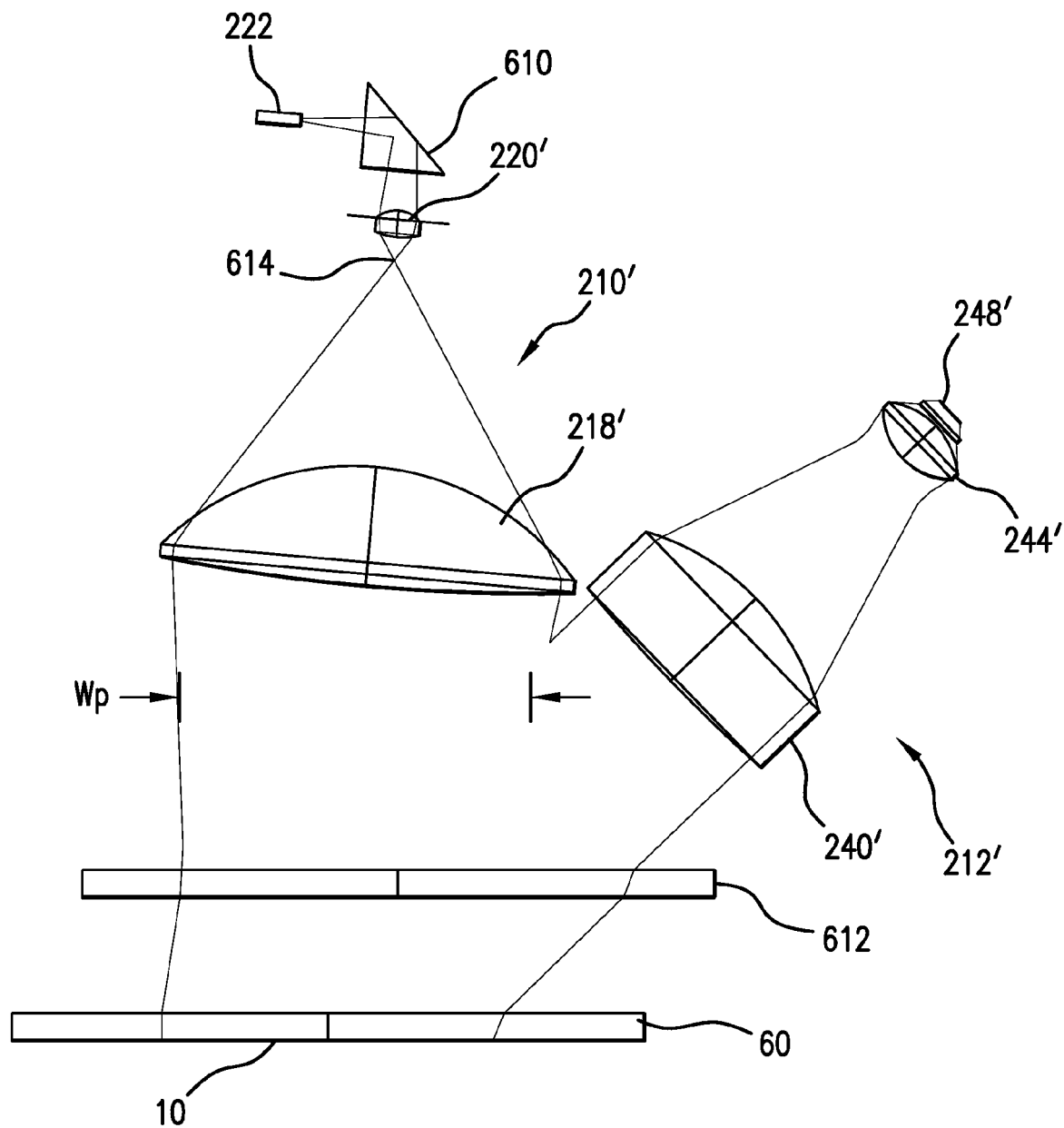
FIG. 7 is a ray trace for the second embodiment optical probe.

FIG. 7 is a ray trace illustrating the relationship between the projection lens system 212' and the rays collected by the collection lens system 212' of the second embodiment probe 110'.

As illustrated, the high NA lens system of the collection lens system 212' collects signal over the entire expanse of the tunable optical signal beam projected on to sample 10 that is located on the outer side of window 60.

In order obtain a uniform, tophat distribution, the projection lens system 210' uses a first molded aspheric lens 220' to bring the light from the tunable laser to a spherically aberrated spot 614. The expanding beam from lens 220' is collected and collimated by lens 218', which is also aspheric. This yields the large, $W_p$=30 to 40 millimeter, beam having a uniform intensity distribution.

Figure 8:
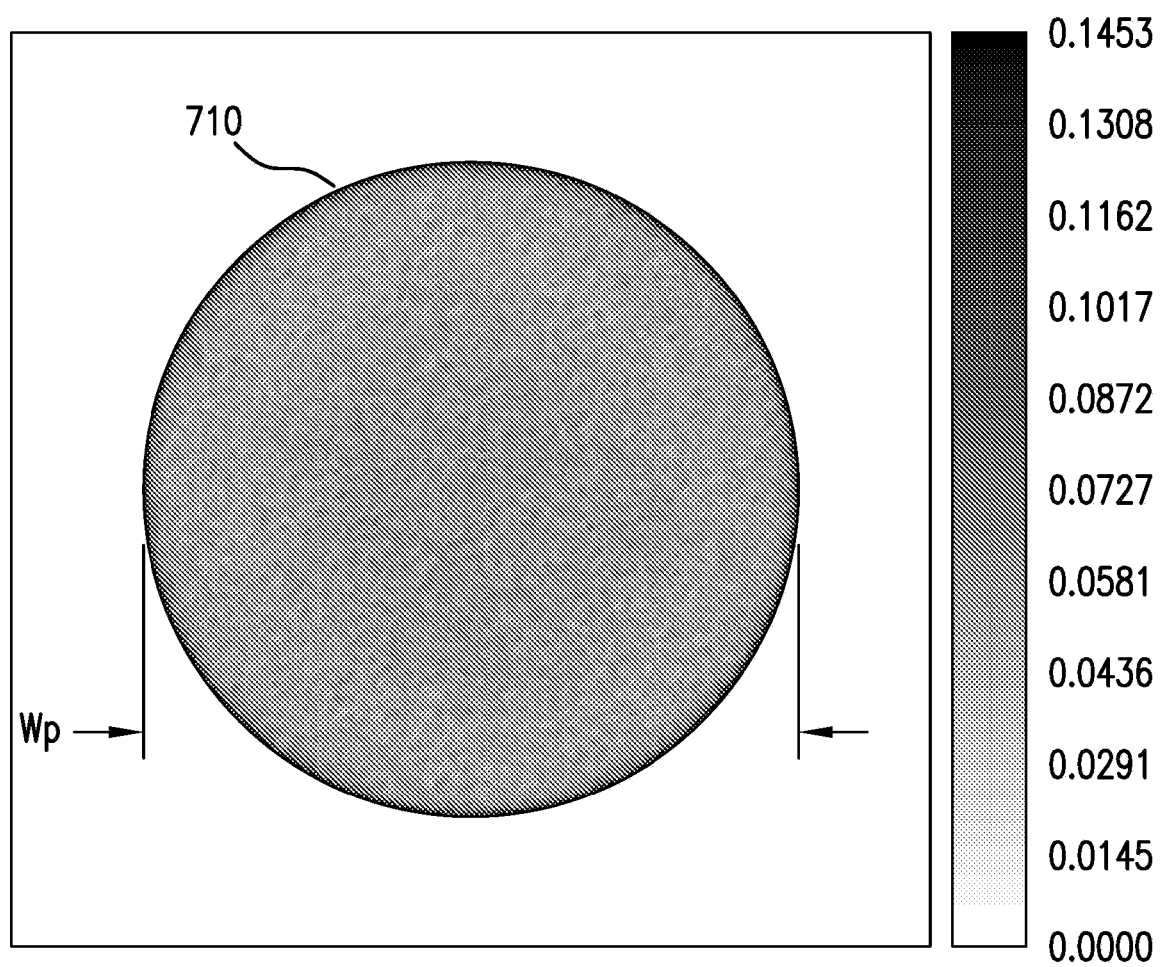
FIG. 8 shows an intensity distribution for the tunable signal from the projection lens assembly of the second embodiment probe.

FIG. 8 illustrates the beam intensity distribution of the tunable signal from the tunable laser in the second embodiment probe 110'. The distribution was derived from a Monti-Carlo simulation taken in plane perpendicular to optical axis 225' of the projection lens system 210'. The intensity distribution of the single mode fiber is converted to the tophat distribution in which the intensity variation over width $W_p$ is less than 10% to 20% except for a bright ring 710 at the beam periphery.

Figure 9:
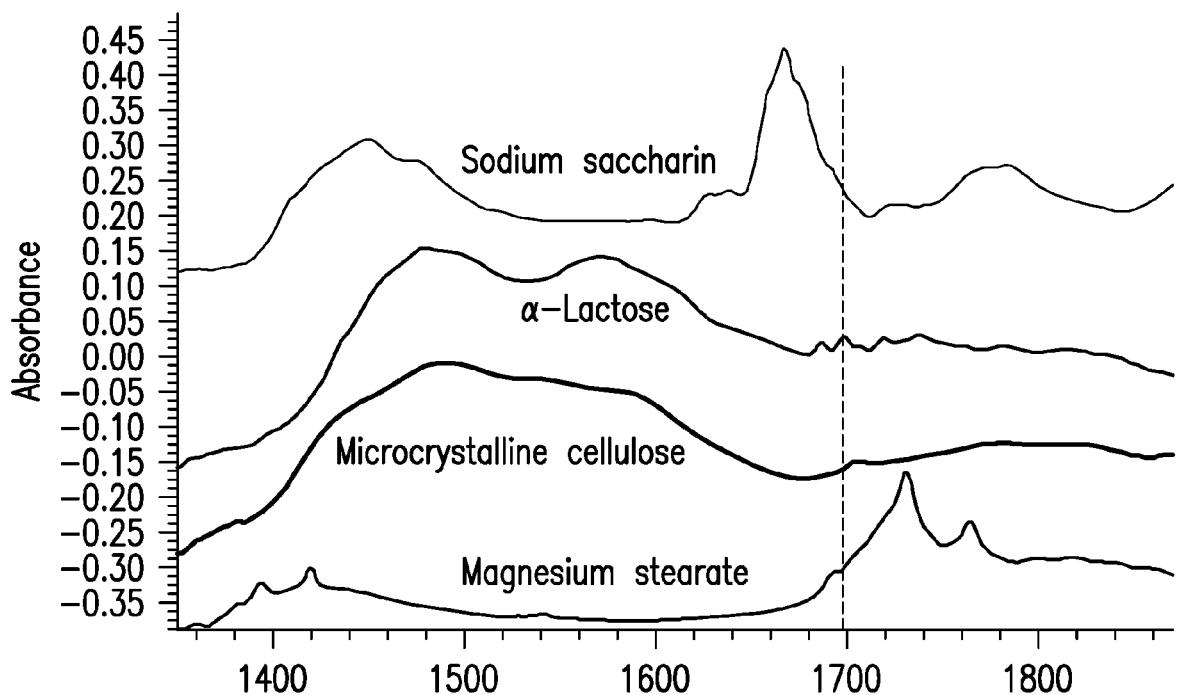
FIG. 9 is a plot of absorbance as a function of wavelength for various chemicals.

FIG. 9 is a plot of absorbance, arbitrary units, as a function of wavelength. Specifically, in this illustrated example, the scan band of the tunable laser covers approximately 1350 to 1900 nanometers. In this range, common pharmaceutical materials, including sodium saccharin, lactose, monocrystalline cellulose, and magnesium stearate exhibit characteristic optical signatures.

Figure 10:
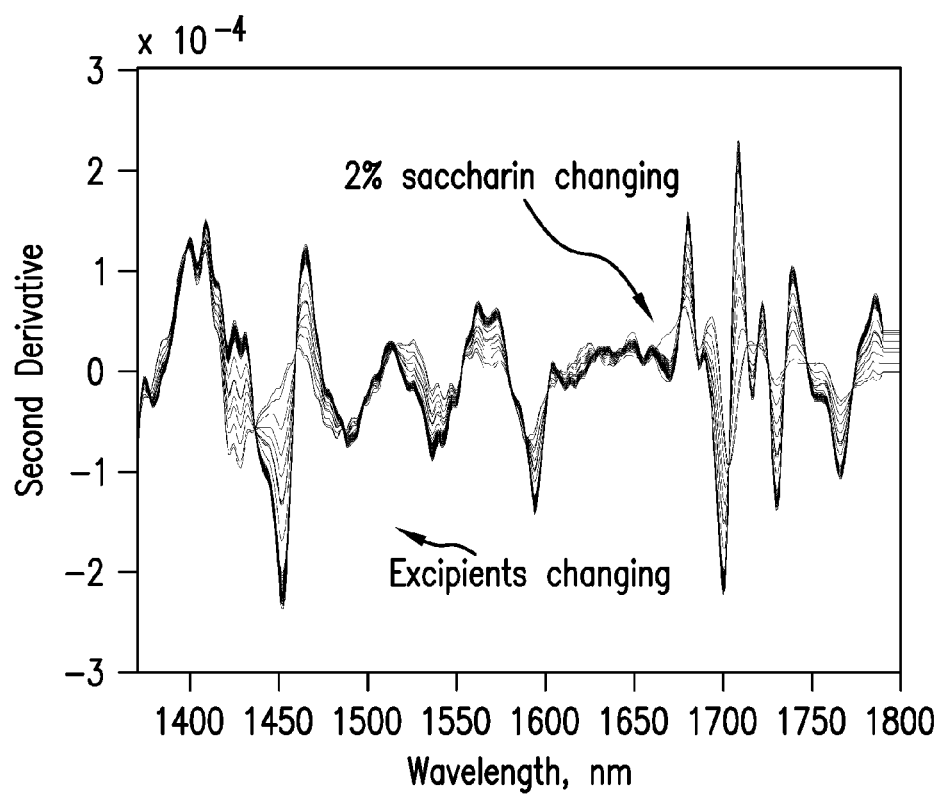
FIG. 10 is a plot of the second derivative of the spectral response as a function of wavelength for a blending process.

As illustrated in FIG. 10, a plot of the second derivatives of the response as a function of wavelength between 1350 and 1800 nanometers shows changes over a blending process, including saccharine, lactose, monocrystalline cellulose, and magnesium stearate due to the mixing action. This shows the dependency of the spectrum as a function of time during blending.

Figure 11:
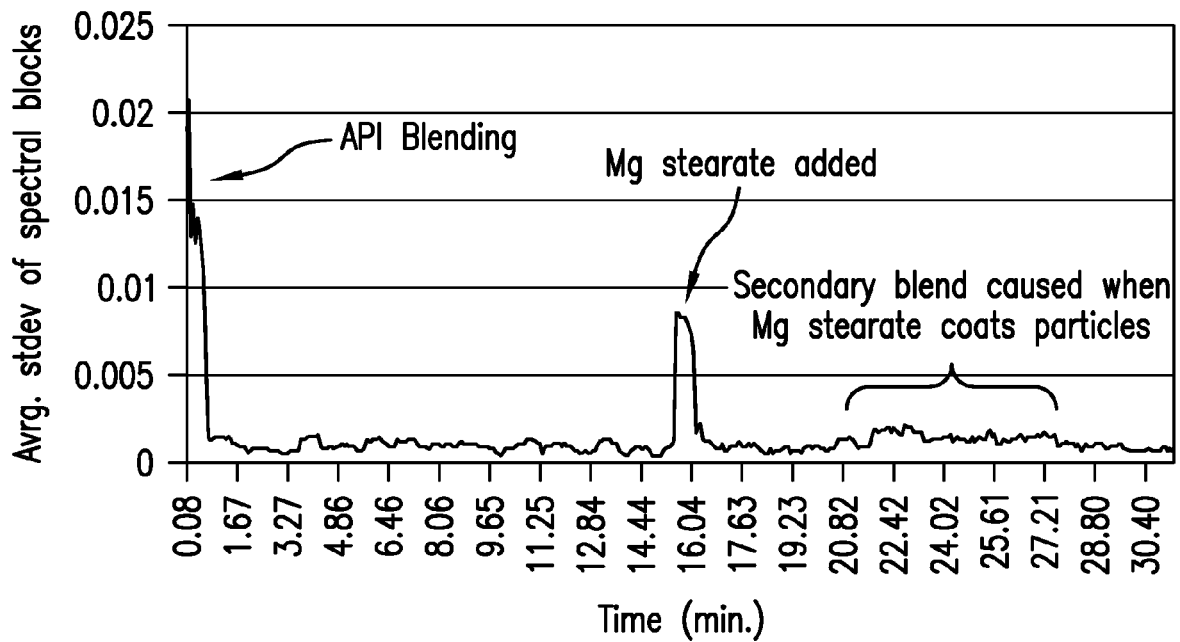
FIG. 11 is a plot of average standard deviation of spectral blocks over the course of a blending process.

FIG. 11 is a plot of average standard deviation of spectral blocks as a function of blending time. Specifically, after approximately 1 minute, the spectral response stabilizes until the 16 minute mark when magnesium stearate is added. This leads to a change in the standard deviation of the spectrum which then stabilizes after approximately 17 minutes of blending, showing how the present system is able to monitor the progress of the blending process.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process monitoring system for determining a spectral response of a process material, the system comprising:
    a drum for containing a process material, the process material being processed within the drum, the drum comprising a window element;
    a semiconductor tunable source for generating an optical signal that is wavelength tuned over a scan band; and
    an optical probe, secured on an outside of the drum, for conveying the optical signal to the process material, through the window element, and detecting the optical signal after diffuse reflection, received through the window element, from the process material to yield the spectral response of the process material, the optical probe for expanding a beam of the optical signal to a diameter of greater than 10 millimeters prior to the diffuse reflection from the process material,
    wherein the optical probe comprises a projection lens system that expands the beam of the optical signal from the tunable source to the diameter of greater than 10 millimeters using a series of projections lenses that expand and improve a collimation of the beam of the optical signal.

2. A system as claimed in claim 1, wherein the diameter of the beam of the optical signal is greater than 20 millimeters.

3. A system as claimed in claim 1, wherein the diameter of the beam of the optical signal is greater than 30 millimeters.

4. A system as claimed in claim 1, wherein the beam of the optical signal is collimated.

5. A system as claimed in claim 1, wherein the beam of the optical signal has a divergence angle of less than 4 degrees.

6. A system as claimed in claim 1, further comprising a host system for controlling a material processing system, including the drum, that is containing the process material in response to the detected spectral response of the process material.

7. A system as claimed in claim 1, wherein the window element between the optical probe and the process material is made of nitrogen impregnated sapphire.

8. A system as claimed in claim 1, wherein the optical probe further comprises:
    a frame secured to the drum;
    said projection lens system carried by the frame for receiving the optical signal from the semiconductor tunable source and expanding and collimating the beam of the optical signal;
    a detector for detecting light from the process material; and
    a collection lens system for collecting light from the process material and directing the light to the detector.

9. A system as claimed in claim 1, further comprising a single mode fiber for receiving the optical signal from the tunable signal source and transmitting the optical signal to the series of projection lenses.

10. A system as claimed in claim 1, wherein the optical probe further comprises:
    a detector for detecting light from the process material; and
    a collection lens system that is angled relative to the projection lens system for collecting the optical signal after diffuse reflection from the process material and directing the light to the detector.

11. A system as claimed in claim 1, wherein the projection lens system converts a Gaussian intensity distribution of the beam to a more uniform intensity distribution.

12. A system as claimed in claim 1, wherein the projection lens system comprises two lenses in which the beam goes through a focal spot between the two lenses.

13. A system as claimed in claim 1, wherein the optical probe further comprises
    a detector for detecting light from the process material; and
    a collection lens system for collecting the optical signal after diffuse reflection from the process material and directing the light to the detector.

14. A process monitoring system for determining a spectral response of a process material, the system comprising:
    a drum for containing a process material, the process material being processed within the drum;
    a semiconductor tunable source for generating an optical signal that is wavelength tuned over a scan band; and
    an optical probe, secured on an outside of the drum, for conveying the optical signal to the process material and detecting the optical signal after diffuse reflection from the process material to yield the spectral response of the process material, the optical probe for expanding a beam of the optical signal to a diameter of greater than 10 millimeters prior to the diffuse reflection from the process material, wherein the optical probe comprises:
        a projection lens system that expands the beam of the optical signal from the tunable source to the diameter of greater than 10 millimeters using a series of projection lenses,
        a detector for detecting light from the process material, and
        a collection lens system that is angled relative to the projection lens system for collecting the optical signal after diffuse reflection from the process material and directing the light to the detector.

15. A system as claimed in claim 14, wherein the projection lens system converts a Gaussian intensity distribution of the beam to a more uniform intensity distribution.

16. A system as claimed in claim 14, wherein the projection lens system comprises two lenses in which the beam goes through a focal spot between the two lenses.

* * * * *